P. B. DE ROUVRE.
APPARATUS FOR MAKING FERTILIZER FROM REFUSE MATERIAL.
APPLICATION FILED AUG. 6, 1909.
1,056,837.
Patented Mar. 25, 1913.
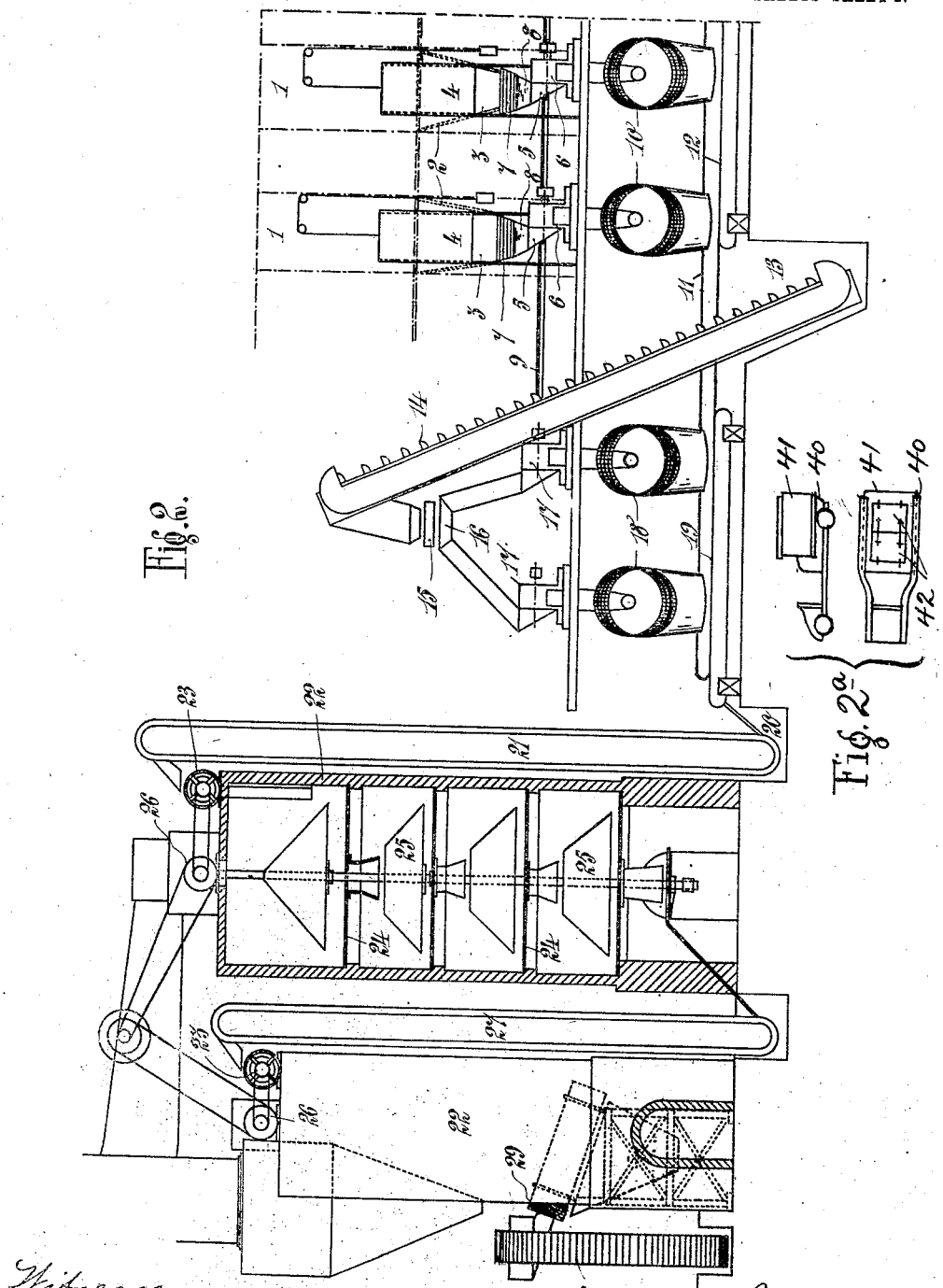

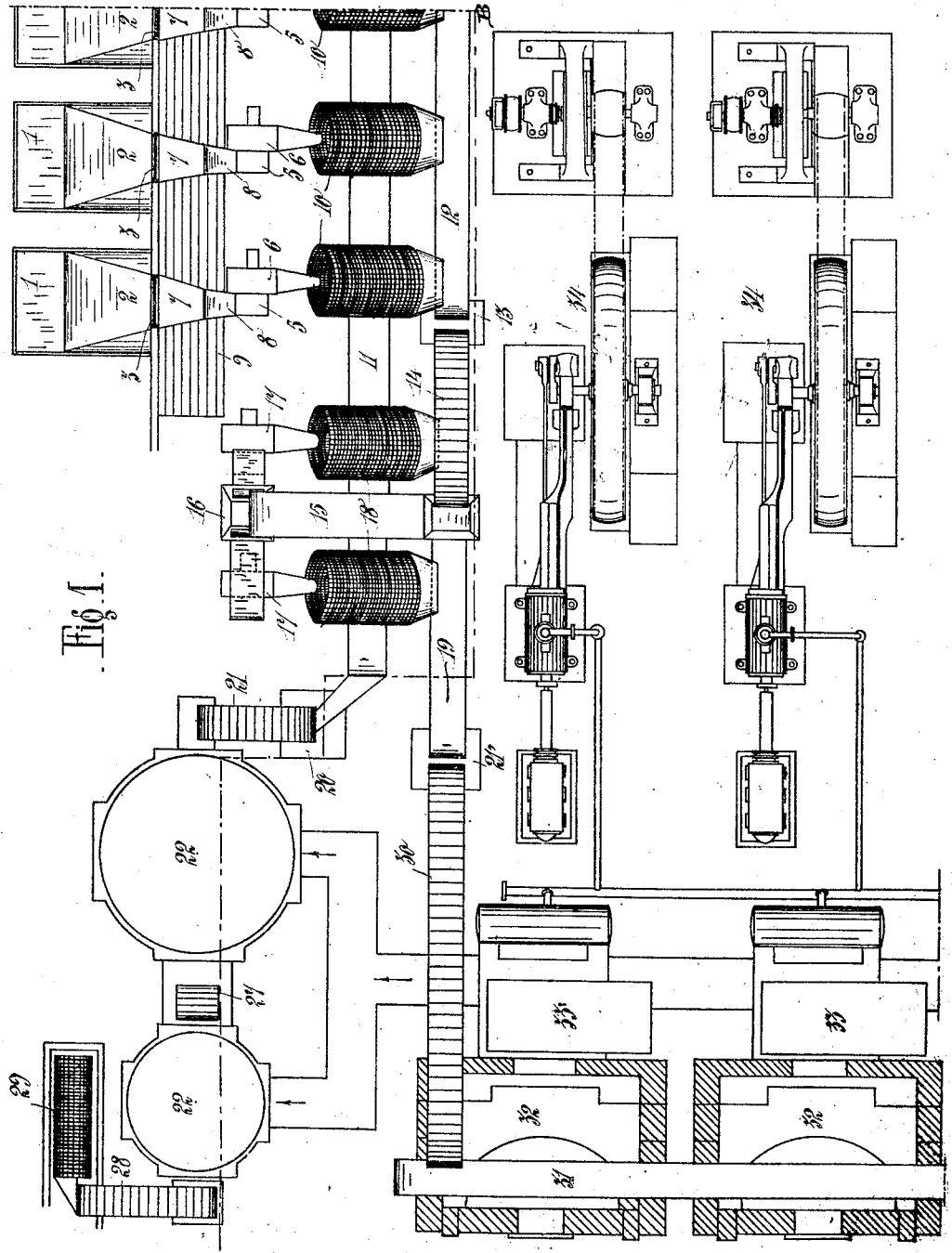

UNITED STATES PATENT OFFICE.

PHILIPPE BRUNOT DE ROUVRE, OF PARIS, FRANCE, ASSIGNOR TO SOCIÉTÉ GÉNÉRALE DES ENGRAIS ORGANIQUES, OF PARIS, FRANCE.

APPARATUS FOR MAKING FERTILIZER FROM REFUSE MATERIAL.

1,056,837. Specification of Letters Patent. Patented Mar. 25, 1913.

Application filed August 6, 1909. Serial No. 511,632.

*To all whom it may concern:*

Be it known that I, PHILIPPE BRUNOT DE ROUVRE, a citizen of the French Republic, residing at Paris, in France, have invented a certain new and useful Apparatus for Making Fertilizer from Refuse Material, of which the following is a specification.

This invention relates to an installation for the treatment of sewage and house refuse generally in order to convert such waste products into manure in the form of extremely fine, dried and sterilized powder or into combustible material. In the latter case the heat produced by burning the material is utilized and the sewage or refuse is completely destroyed.

A construction of the installation according to this invention is illustrated, by way of example, in the accompanying diagrammatic drawings, in which—

Figure 1 is a plan and Fig. 2 is a vertical longitudinal section through the line A—B Fig. 1. Fig. 2ª shows by a side view and a plan view one of the carts.

The sewage or refuse is brought to the receiving room by carts 40, the removable body 41 of which is provided with a bottom with flap valves 42 opening like those of a non-oscillating coal skip.

The material is carried on a monorail mechanism to closed refuse receivers or driers 1 which communicate each by a lower discharge hopper 2 and through an opening 3 with a vertically sliding door or panel 4, with the charging hopper 8 of a crusher 6. The panels 4 are provided with balance weights which move in lateral guides, and regulate the discharge of the material to be treated on to a sorting table 7 arranged in front of a hopper 8 which communicates with the crusher 6 by the neck 5. The receivers 1 are fed from the dust boxes 1ª which dust boxes are the bodies 41 of the carts 40 after being removed, and which bodies are, as before mentioned, provided with bottoms which open like flap valves as soon as they are released. Men standing on a raised floor 9 regulate the discharge of the sewage which moves toward the crushers 6.

Material reduced to powder in the crushers 6, is discharged into inclined lower screen-drums 10 which are rotatable and in which the first screening, to separate the sewage converted into powder takes place. The powder falls on to the common conveyer 11, which circulates under the battery of drums corresponding to the battery of crushers. The material which is too coarse to pass through the screen-drums 10 is discharged on to another common conveyer 12 terminating at a receiving pit 13. This arrangement of drums combined respectively with one crusher each, avoids, in large installations, the accumulation of non-converted material which takes place if a single drum is used for a whole battery of crushers working in parallel, such accumulation resulting in the choking of the drum and a very imperfect screening. Moreover in the case of a single drum the inspection and attendance are not easy.

From the pit 13 the material is raised by a bucket chain 14 to a second battery of crushers. To that end the bucket chain discharges the said material on to a transverse conveyer 16 with a double chute, supplying two or more crushers 17. The material treated in the crushers 17 is screened in drums 18 arranged under each crusher, the powder being discharged on to the conveyer 11, and the coarser material on to another conveyer 19 discharging it into pit 21' (Fig. 1). The powder which is to form manure, is discharged by the general conveyer 11 into the pit 20 wherein moves an inclined conveyer 21, which carries the said powder to the drying installation. The powder is discharged by the conveyer 21 into a rotary distributer 23 which introduces it into towers or drying kilns with several floors. Each floor, which is separated from the adjoining ones by a horizontal screen 24, is provided with a rotatable hollow cone 25 on which the powder is spread.

Hot gases from smoke flues are introduced into the lower portion of the tower 22 and, being drawn upward by an upper exhauster 26, bring about the drying and the sterilization of the powder, which in order to complete the sterilizing action is introduced into a second tower 22 in which it undergoes similar treatment. A conveyer 27 transfers the powder from the bottom of the first tower. This drying process is to complete the drying action which commenced with the crushing, and has also for its object to destroy the micro-organisms that are liable to produce fermentation on contact with the air. This fermentation takes place in the manure as usually prepared, and it was only possible to avoid such fermentation in an imperfect manner, by carrying it in vessels or closed cars. According to this invention therefore, a new industrial result is produced. On leaving the second tower, the dry powder is raised by a bucket chain 28 to the drum 29 where the screening is completed, and where waste that cannot be utilized, is separated. The drums 10, 18 and 29 are formed in the known manner, of cylinders of wire gauze, the meshes of which are about 2.5 m/m. across.

All material not converted and discharged into the pit 21', is raised by the hoist 30 and discharged again on to a conveyer 31 feeding a battery of furnaces 32 in which it is completely destroyed. The heat produced is utilized, first of all for the boilers 33 in connection with the said furnaces and then, by circulation in the drying kilns 22, for the complete conversion into manure of the powdered product.

The steam produced in the boilers 33, is utilized for generating power in driving engines 34 used for lighting or driving fans, rotary distributers, conveyers, or other machinery.

What I claim as my invention and desire to secure by Letters Patent is:—

An apparatus for making fertilizer from sewage and house refuse, and utilizing the waste product for generating power and hot gases, comprising drying receivers, refuse crushers arranged in parallel, drum screens disposed below the crushers, a conveyer common to the drum screens, drying towers to which the conveyer carries the material from the drum screens, a second set of crushers and screens for the material which is too coarse to pass through the screens first mentioned, a conveyer to carry the said coarse material from the first to the second set of crushers and screens, a conveyer common to the second set of drum screens to carry the crushed material from said drum screens to the drying towers, furnaces for the incineration of the material which is too coarse to pass through the second set of screens and a conveyer to carry the said coarse material to the furnaces from the second set of screens.

In testimony whereof I have signed my name to this specification in the presence of two subscribing witnesses.

PHILIPPE BRUNOT DE ROUVRE.

Witnesses:
 H. C. COXE,
 GEORGES BONNEUIL.